United States Patent
Duale et al.

(10) Patent No.: US 10,320,726 B2
(45) Date of Patent: Jun. 11, 2019

(54) PREDICTIVE MESSAGE PERSONALIZATION

(71) Applicant: International Business Machines Corporation, Armonk, NY (US)

(72) Inventors: Ali Y. Duale, Poughkeepsie, NY (US); Shailesh R. Gami, Poughkeepsie, NY (US); Louis P. Gomes, Poughkeepsie, NY (US); Rajaram B. Krishnamurthy, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 15/233,163

(22) Filed: Aug. 10, 2016

(65) Prior Publication Data

US 2018/0048600 A1     Feb. 15, 2018

(51) Int. Cl.
*G06F 15/16* (2006.01)
*H04L 12/58* (2006.01)
*H04L 29/08* (2006.01)

(52) U.S. Cl.
CPC .......... *H04L 51/063* (2013.01); *H04L 51/18* (2013.01); *H04L 67/18* (2013.01)

(58) Field of Classification Search
CPC ........ H04L 51/063; H04L 51/18; H04L 67/18
See application file for complete search history.

(56) References Cited

U.S. PATENT DOCUMENTS

| | | | | |
|---|---|---|---|---|
| 6,732,149 B1 * | 5/2004 | Kephart | ............... | G06Q 10/107 709/206 |
| 7,203,753 B2 * | 4/2007 | Yeager | .................... | G06F 9/544 709/223 |
| 7,206,841 B2 * | 4/2007 | Traversat | ............. | G06F 9/4416 709/203 |
| 7,206,934 B2 * | 4/2007 | Pabla | ..................... | H04L 63/02 709/226 |

(Continued)

OTHER PUBLICATIONS

Kumar et al.; "Method and System for Providing Relevant Suggestions for Instant Messaging System"; An IP.com Prior Art Database Technical Disclosure; IP.com No. 000214180; Jan. 16, 2012; 3 Pages.

(Continued)

*Primary Examiner* — Moustafa M Meky
*Assistant Examiner* — Thorne E Waugh
(74) *Attorney, Agent, or Firm* — Walter L. Rudberg; Arnold B. Bangali

(57) ABSTRACT

Embodiments of the present invention provide a method, computer program product, and a computer system for predicting message personalization. According to one embodiment a message is received on a first device, wherein the message is sent from a second device, and wherein the first device and the second device are in a community. An escape character followed by a keyword in the received message is detected. A detailed message is determined based in part on the keyword in the received message associated with the community. Next the escape character and the keyword are replaced with the determined detailed message. Finally, the received message and the determined detailed message are displayed.

20 Claims, 5 Drawing Sheets

(56) References Cited

U.S. PATENT DOCUMENTS

| | | | | |
|---|---|---|---|---|
| 7,480,512 | B2* | 1/2009 | Graham | G06Q 30/02 |
| | | | | 455/456.3 |
| 7,593,740 | B2* | 9/2009 | Crowley | H04M 3/42 |
| | | | | 455/456.3 |
| 7,596,269 | B2* | 9/2009 | King | H04N 1/00244 |
| | | | | 382/177 |
| 7,657,597 | B2* | 2/2010 | Arora | H04L 51/04 |
| | | | | 707/830 |
| 7,774,495 | B2* | 8/2010 | Pabla | H04W 8/005 |
| | | | | 455/432.2 |
| 7,783,777 | B1* | 8/2010 | Pabla | G06F 17/30206 |
| | | | | 709/238 |
| 7,885,844 | B1* | 2/2011 | Cohen | G06Q 10/10 |
| 8,825,472 | B2* | 9/2014 | Raghuveer | G06F 17/2785 |
| | | | | 704/10 |
| 2004/0172415 | A1* | 9/2004 | Messina | G06F 17/30864 |
| 2012/0005221 | A1 | 1/2012 | Ickman et al. | |
| 2013/0080544 | A1* | 3/2013 | Lyons | G06Q 10/107 |
| | | | | 709/206 |
| 2014/0136997 | A1 | 5/2014 | Spivack et al. | |
| 2014/0156341 | A1* | 6/2014 | Kruk | G06Q 50/01 |
| | | | | 705/7.29 |
| 2017/0249291 | A1* | 8/2017 | Patel | G06F 17/24 |
| 2017/0346938 | A1* | 11/2017 | Allen | H04M 1/72552 |

OTHER PUBLICATIONS

"A Mechanism to gather data and push reminder messages to planned event based on user's behavior pattern and analyzed network matching data"; An IP.com Prior Art Database Technical Disclosure; IP.com No. 000241618; May 18, 2015; 5 Pages.

* cited by examiner

PREDICTIVE MESSAGE PERSONALIZATION

BACKGROUND OF THE INVENTION

The present invention relates generally to the field of mobile computing, and more particularly to an intelligent telecommunication messaging system.

Computing devices provide a user with access to communication capabilities even as the user moves about to various locations. Advances in electronic technology allow for near instantaneous communication between persons, regardless of distance. Messaging communication includes the act of composing and sending electronic messages between two or more computing devices. Messaging is often used between private mobile phone users (a computing device), as a substitute for voice calls.

SUMMARY

According to one embodiment of the present invention, a method for predicting message personalization is provided. The method may include: receiving a message on a first device, wherein the message is sent from a second device, and wherein the first device and the second device are in a community; detecting an escape character followed by a keyword in the received message; determining a detailed message based in part on the keyword in the received message associated with the community; replacing the escape character and the keyword with the determined detailed message; and displaying, by one or more processors, the received message and the determined detailed message.

Another embodiment of the present invention provides a computer program product for predicting message personalization, based on the method described above.

Another embodiment of the present invention provides a computer system for predicting message personalization, based on the method described above.

DETAILED DESCRIPTION

Figure 1:
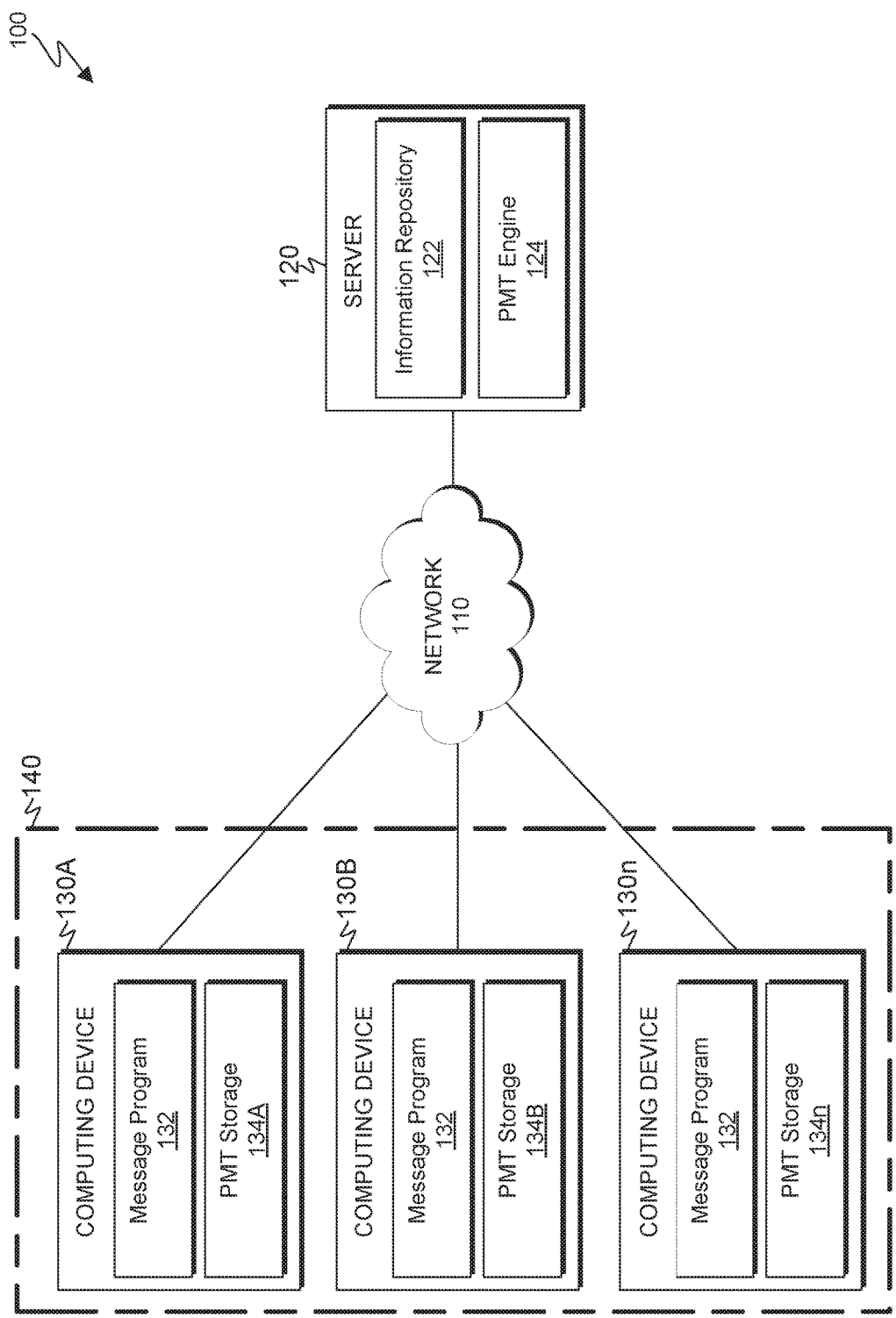
FIG. 1 is a functional block diagram illustrating a data processing environment, in accordance with an embodiment of the present invention.

The embodiments of the present invention will be described in the context of electronic devices and user interfaces. Electronic devices, such as mobile phones, tablet computers, laptop computers, personal computers, e-readers, or any other electronic devices having a graphical user interface (GUI) allow a user to interact with the device through various input/output (I/O) interfaces. Further, electronic devices with a connection to a network may send and/or receive communications with other electronic devices.

A common means of communication is through sending and receiving text messages, emails, status updates (through social media) etc. Typically, sending a message requires a user to type out ones thoughts, which is often time consuming and prone to typographical errors. Occasionally, common well known abbreviations are used in order to speed up ones typing speed. Additional features such as autocorrect and auto complete etc., have been implemented in order to increase speed and accuracy of sending a message. However such features are limited to completing a limited number of words.

Social networking provides a platform to establish relationships allowing members to share ideas with similarly interested members. Social networking attempts to bring persons with a commonality together. In this context, persons who share similar personal interests, career interests, activities, backgrounds, demographics, hobbies, professional skills, resources, geographic locations or real-life connections, etc., may establish one or more social network communities, thereby providing a connection between persons who share a common link. A person may be part of one or more social networks, known as a community. Social networking attempts to bring persons with common interests together, by providing features to facilitate an exchange of ideas.

Through the use of social networking and various messaging systems, a user can communicate in real time with other users. An exemplary messaging system may include a conversation box, where the text of the communication is shown to both users. The messaging system may also include a typing box or keyboard for the user to input his respective message to be set to other users.

Embodiments of the present invention may be utilized in a plurality of environments and functions. For example, the embodiments of the present invention may be utilized by: businesses, students, educators, researchers, government agencies, employees, and the like.

Embodiments of the present invention provide a system and method which automatically creates, generates, amends, and augments a personalized message translation file. Embodiments of the present invention provide personalized relevant shorthand and/or abbreviations to be sent between two or more users of a messaging system. Embodiments of the present invention transform a shorthand and/or abbreviation to actual word(s) based on who the identity and relationship between the sender and the receiver. For example, in an embodiment, in order to increase the speed and accuracy of typing a message, a user may write a message which includes shorthand and/or abbreviations; thereafter, when the message is received, the shorthand and/or abbreviations are fully spelled out.

Embodiments of the present invention may also extract content of the message by parsing the conversation history. After parsing the conversation history the present invention may suggest various shorthand and/or abbreviations for various commonly used terms in order to speed up the typing of the message. The suggestions may be presented to the user in two parts, the first part is the actual word(s) and the second part may contain one or more suggested shorthand and/or abbreviations for the user to select.

Embodiments of the present invention may create custom shorthand and/or abbreviations for specific groups of persons, hereinafter referred to as a community. A community may represent a group of persons with one or more similarities; whereby the shorthand and/or abbreviations may be accessible to everyone in that specific community. Further, embodiments of the present invention may determine which persons should be in a specific community. For example, if upon deriving a common link and/or similarities between two or more persons, the specific shorthand and/or abbreviations may be utilized by all persons in the community. Embodiments of the present invention may suggest additional persons to be included in a community.

Embodiments of the present invention may create a personalized message translator (hereinafter referred to as 'PMT'). The PMT may be shared with members of a social network, community and/or specific individuals. For example, a specific PMT may be shared among a specific community, prior to sending a message, thereby allowing the message to be shorter prior to sending, and uncompressed by the receiving members.

A user may be part of one or more communities. Embodiments of the present invention may utilize specific shorthand and/or abbreviations for specific communities. An abbreviation may have different meanings in different communities. For example an abbreviation of 'GM', may represent a plethora of word(s), such as: 'good morning'; 'general manager'; 'group manager'; 'genetic modification'; 'genetically modified'; 'gold medal'; 'Germany'; 'great move' (for online gaming); 'group message'; 'global memory'; etc. Further, within specific communities the abbreviation may be personal to specific work or social activities, based on the context, time, date, and/or geographic location of either the sender and/or receiver of the message. A further discussion of communities is discussed infra in reference to FIGS. 3A and 3B.

It is noted that, embodiments of the present invention may refer to a user of a messenger as a member of one or more communities.

The present invention will now be described in detail with reference to the Figures. FIG. 1 is a functional block diagram illustrating a data processing environment ("environment"), generally designated 100, in accordance with an embodiment of the present invention. FIG. 1 provides only an illustration of one embodiment and does not imply any limitations with regard to the environments in which different embodiments may be implemented. Many modifications to the depicted environment may be made by those skilled in the art without departing from the scope of the invention, as recited by the claims. In this exemplary embodiment, environment 100 includes server 120, computing device(s) 130A-130n within a single community 140 all interconnected over network 110. Server 120, and computing devices 130A-130n may include internal and external hardware components, as depicted and described in further detail with respect to FIG. 4.

In an embodiment, network 110 may be a local area network ("LAN"), a wide area network ("WAN"), such as the Internet, the public switched telephone network ("PSTN"), a mobile data network (e.g., wireless Internet provided by a third or fourth generation of mobile phone mobile communication), a private branch exchange ("PBX"), any combination thereof, or any combination of connections and protocols that will support communications between network, 110, server 120, and computing devices 130A-130n.

In an embodiment, network 110, may be a computer network with a small geographic scope. Computer networks with a small geographic scope range from near field communication ("NFC") to LAN's. A computer network with a small geographic scope may have a connection to the Internet or other remote networks. Network 110 can be used for communication among computing devices 130A-130n themselves or for connecting to a higher level network (e.g., the Internet). Network 110 may also be considered a wireless personal area network ("WPAN") carried over wireless network technologies such as Bluetooth® or peer-to-peer communications over a wireless LAN (Bluetooth is a registered trademark of Bluetooth SIG, Inc.). In embodiments of the present invention, computing devices 130A-130n each have the necessary hardware to allow for communication over any preconfigured type of network 110 used for communication between them (e.g., a Bluetooth radio), and/or the Internet at large.

Network 110 architecture may include one or more information distribution network(s) of any type(s), such as, cable, fiber, satellite, telephone, cellular, wireless, etc., and as such, may be configured to have one or more communication channels. In another embodiment, network 110 may represent a "cloud" of computers interconnected by one or more networks, where network 110 is a computing system utilizing clustered computers and components to act as a single pool of seamless resources when accessed.

Network 110 may be configured to exchange messages wirelessly or wired between computing devices 130A-130n. Messages may be sent using the Short Message Service (SMS). Messages may be sent using the Multimedia Message (MMS). An MMS may contain images, videos, and sound content, as well as ideograms known as emoji. The services used to transmit messages may have different colloquialisms depending on the region from which the message originates (the location of the sender of the message). For example, the message may be simply referred to as a text throughout North America, the United Kingdom, Australia, New Zealand and the Philippines. However in most of mainland Europe the message is referred to as an SMS. The sender of a text message is commonly referred to as a texter.

In the exemplary embodiment, server 120 is a server computer. In other embodiments, server 120 may be a management server, a web server or any other electronic device capable of receiving and sending data. In another embodiment, server 120 may represent a server computing system utilizing multiple computers as a server system, such as in a cloud computing environment. Server 120 contains at least information repository 122 and PMT engine 124.

Information repository 122 may include any suitable volatile or non-volatile computer readable storage media, and may include random access memory (RAM) and cache memory (not depicted in FIG. 1). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information. Information repository 122 can be implemented using any architecture known in the art such as, for example, a relational database, an object-oriented database, and/or one or more tables. Information repository 122 may contain additional information, software and/or data as necessary, identifiable by those skilled in the art. While depicted on server 120, in the exemplary embodiment, information repository 122 may be on a remote server or a "cloud" of computers interconnected by one or more networks utilizing clustered computers and components to act as a single pool of seamless resources, accessible by computing devices 130A-130n via network 110.

Information repository 122 may store the data of the abbreviated keywords and the full text of each respective keyword. For example, information repository 122 may contain the PMT for the one or more members. Each PMT will contain the keywords and corresponding detailed messages. Keywords are the designated shorthand and/or abbreviations used by the members of each community. The corresponding detailed messages is the word, phrases, sentences, paragraphs, emoji's emoticons, etc. that each keyword represents. Information repository 122 may also store the listing of each member contained within each community.

PMT engine 124 maintains each PMT within information repository 122. PMT engine 124, may also be in communication with computing device 130A-130n via network 110, in order to continually update each PMT within information repository 122. PMT engine 124 may also be in communication with computing device 130A-130n via network 110, in order to send newly updated PMT's to each member within a community.

In an embodiment, PMT engine 124 may perform a cognitive analysis of each member's messages. For example, PMT engine 124 may parse through messages sent within each community and/or for each member, thereby allowing PMT engine 124 to learn the style of past interactions for each member and the community at large. Thereby allowing PMT engine 124 to learn frequently used shortcuts with a user, a community, members within a community, and/or a social media group. Through the learning process, PMT engine 124 may determine and suggest to a user and/or members of a community various keyword links to a meaningful 'detailed message', 'phrases', and/or 'word(s)'.

Each member of a community or individual user may modify a PMT file with a new shorthand and/or abbreviation. If the modification is made by a member in a community, PMT engine 124 receives the updates to a PMT file and then sends it out to other users in a community. In an embodiment, each PMT is sent automatically to each member in a community once an update is made. In an embodiment, after an update is made by a member in a community, the PMT may be transmitted manually to the rest of the community.

Computing devices 130A-n in many respects, represent any number of computing devices in communication between themselves and server 120. Further, computing devices 130A-130n may be any electronic computing device capable of electronic communication. For example, computing devices 130A-130n include, but are not limited to, cellular phones, smart phones, mobile phones, Wi-Fi phones, wearable computing devices, laptop computers, tablet computers, desktop computers, handheld computers, netbooks, personal organizers, e-reading devices, and the like. It is noted that the term computing device is not delimiting, rather, it represents a type of device which is capable of sending and receiving messages. Each computing device 130A-130n may be associated with one user (not shown). Computing devices 130A-n each comprise, among other things, message program 132 and PMT storage 134A-n, respectively.

In an embodiment, message program 132 may be located on each computing device 130A-n. In an embodiment, message program 132 may be located on a server remotely located. In an embodiment, message program 132 may be a standalone program/application on computing devices 130A-130n. In an embodiment, message program 132 may be associated and/or linked to another messenger application/program. For example, message program 132 may be associated with an existing message exchanging provider/service.

Message program 132 may activate upon detecting a 'escape' character in front of a keyword that a user typed. An 'escape' character is a typed character which invokes an alternative interpretation on subsequent characters in a character sequence. In general, in establishing a character as an 'escape' character, depends on context. The 'escape' character's purpose is to start character sequences, such as identifying the keyword for message program 132. Message program 132 identifies each keyword by use of an 'escape' character prior to the keyword. The use of the 'escape' character, prior to the keyword, effectively distinguishes the keyword from the text of the message. Further, the 'escape' character directs message program 132 to search PMT storage 134A-134n (depending on the respective computing device 130A-130n) for the keyword and its associated meaning. If message program 132 finds the associated meaning to the identified keyword, then message program 132 may indicate to the user that the associated meaning is identified. For example, if the keyword is found, the 'escape' character and keyword may be replaced by the keywords associated meaning. In another example, the 'escape' character and keyword may be replaced by the keywords associated meaning in a different color, font, style, etc., to indicate that the message is still associated with the keyword. The message still contains the 'escape' character and keyword, regardless if the associated meaning is displayed to the sender.

In an embodiment message program 132 may perform a cognitive analysis similar to that of PMT engine 124, but on a local scale, that of the specific user using the specific computing device, such as computing device 130A. The cognitive analysis of message program 132 may also include context based learning. The context based learning may learn with whom the user communicates and in what context. Thereby allowing message program 132 to suggest to the user various keyword links to commonly used 'detailed message', 'phrases', and/or 'word(s)'. Further, based on the sender and the intended receiver of the message, message program 132 may make additional suggestions based on the conversation history between the two. For example, the cognitive analysis of message program 132 may interoperate 'FR' to mean 'Friday', 'Frank', 'fruit' or 'friend'. In one scenario, the cognitive analysis of message program 132 may interoperate "We ate a little FR with dinner" to "We ate a little fruit with dinner". In another scenario, the cognitive analysis of message program 132 may interoperate "I saw your FR walking with him" to "I saw your friend walking with him". In another scenario, the cognitive analysis of message program 132 may interoperate "He comes home on FR" to "He comes home on Friday". In another scenario, the cognitive analysis of message program 132 may interoperate "FR is a reliable person" to "Frank is a reliable person".

Message program 132, located on computing device 130A (sender), may display to the sender (the user) the entire text (the text represented by the escape character coupled with the keyword represent, located in PMT storage 134A); however, when the message is transmitted to the intended recipient, the sent message may only include the escape character coupled with the keyword. Once received on computing device 130B (receiver) message program 132 will replace the 'escape' character and keyword with the keywords associated meaning (as found in PMT storage 134B).

Message program 132, on each respective computing device 130A-130n, may also be in communication with PMT engine 124 via network 110, in order to continually update each PMT (located in PMT storage 134A-134n) with new PMT's as created, amended, and/or updated by other members in a community. Since each member of a community or individual user may modify a PMT file with a new shorthand and/or abbreviation, an updated PMT is distributed to each member within a community.

Additionally, message program 132, may analyze the location of computing device 130A (the sender of a message), and computing device 130B (the receiver of a message) based on a computing device's geographic location. For example, if computing device 130A sends escape character +'GM' intending to say 'Good Morning' (based on computing device 130A's local time zone) to computing device 130B; however, computing device 130B is in a different time zone, message program 132 may change the phrase to 'Good Afternoon' (or 'Good Evening') depending on the time zone in which computing device 130B is located.

PMT storages 134A-n in many respects, represent any number of PMT storage's where each is associated with a respective computing device 130A-130n. PMT storage 134A-134n may include any suitable volatile or non-volatile computer readable storage media, and may include random access memory (RAM) and cache memory (not depicted in FIG. 1). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information. PMT storages 134A-134n can be implemented using any architecture known in the art such as, for example, a relational database, an object-oriented database, and/or one or more tables. PMT storage 134A-134n may contain additional information, software and/or data as necessary, identifiable by those skilled in the art. While PMT storage 134A-134n is depicted on respective computing devices 130A-130n, in the exemplary embodiment, PMT storages 134A-134n may be on a remote server or a "cloud" of computers interconnected by one or more networks utilizing clustered computers and components to act as a single pool of seamless resources, accessible by computing devices 130A-n via network 110.

PMT storages 134A-134n may store the data of the abbreviated keywords and the full text of each respective keyword. For example, PMT storage 134A-134n may contain the PMT for each community 140. Each PMT will contain the keywords and corresponding detailed messages. The corresponding detailed messages is the word, words phrases, sentences, paragraphs, emojis, emoticons, etc. that each keyword represents.

PMT storages 134A-134n may contain multiple associated meanings for a specific keyword. In this situation, message program 132 may parse the intended message to be sent and automatically determine which associated meaning the user intended. Additionally, and/or alternatively, if more than one option is available for the same keyword, message program 132 may prompt the sender of the message to pick one of the available associated meanings. If the user chooses not to pick one of the available associated meanings, message program 132 may allow the user to create a new input and/or send the message as is, without modification.

Community 140 represents a single community that computing devices 130A-130n are within. It is noted that computing devices 130A-130n may be part of multiple communities, as depicted in FIG. 3B. For example, community 140 may link computing devices 130A-130n as the respective users may be co-workers, family, classmates, friends, social groups, etc. As such, each community may share a PMT between its members, thereby allowing each member to community quickly and more accurately send a message to one or more members within the same community. Additionally, by sharing a PMT between a community, the transmitted data size is smaller allowing the transmission to occur quicker. Message program 132 may suggest certain persons be included in various communities either existing or newly created. For example, communities based on a targeted audience, geographic location, business categories, professional categories, etc.

Figure 2:
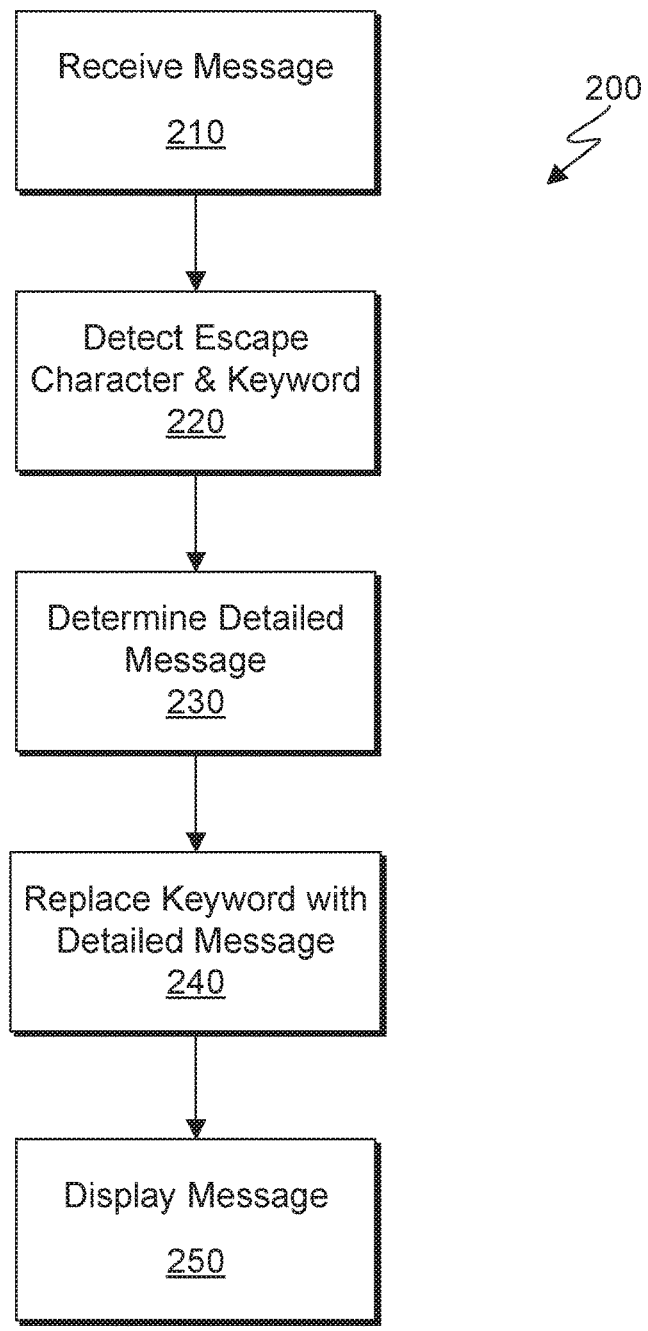
FIG. 2 is a flowchart illustrating operational steps for a personalized messaging system, in accordance with an embodiment of the present invention.

FIG. 2 depicts flowchart 200 illustrating operational steps for a personalized messaging system, in accordance with an embodiment of the present invention. For illustrative purposes, the following discussion is made with respect to computing device 130A; it being understood that the operational steps of FIG. 2 may be performed by any of computing devices 130A-n.

In step 210, message program 132 receives a message from a sender. It is noted that if the message is sent with a keyword, the keyword is sent, rather than the detailed message.

Upon receiving a message, in step 220, message program 132 detects the existence of an escape character. If no escape character is detected within the received message, then the message is displayed to the user. The received message may be parsed to determine common patterns of common word(s) and/or phrases in order to suggest future keywords. Additionally, the received message may be parsed to determine a pattern of communication between the sender and receiver of the message.

If the existence of an escape character is detected, message program 132 detects a keyword following the character. The keyword may be a single character or a sting of characters, dependent on the PMT.

Upon detecting an escape character and a keyword, in step 230, message program 132 determines the detailed message represented by the keyword. Message program 132 may initially detect who sent the message, then determines the community the sender belongs to in order to search the correct PMT file. Alternatively, and/or additionally, message program 132 may detect the community the message is associated with, thereby providing the correct PMT to search.

Message program 132 determines the correct detailed message to display. If the PMT file has only one detailed message associated with the received keyword, message program 132 may determine whether the detailed message is correct. For example, if the detailed message is time sensitive, then message program 132 may change the intended message to a more accurate one. For example, if the received message intended to say 'Good Morning' (based on computing device 130A's local time zone) but the receiver was located in a different time zone, message program 132 may change the received message to 'Good Afternoon' (or 'Good Evening'), depending on the time zone in which computing device 130B is located. Similarly, if the detailed message uses a pronoun that is gender specific, which is not the correct gender of the receiver, then message program 132 may change the pronoun.

If the PMT file has multiple detailed messages associated with the received keyword, message program 132 may determine the correct detailed message. For example if two detailed messages associated with the received keyword, 'GM', are 'general manager' and 'good morning', message program 132 may parse through the received message, as well as prior messages, to determine the correct detailed message.

In step 250, the message is displayed. The displayed message includes the typed text and the detailed message (that was associated with the received keyword). Additionally, and/or alternatively, the escape character coupled with the keyword is displayed, when message program 132 cannot determine the correct detailed message.

Figure 3A:
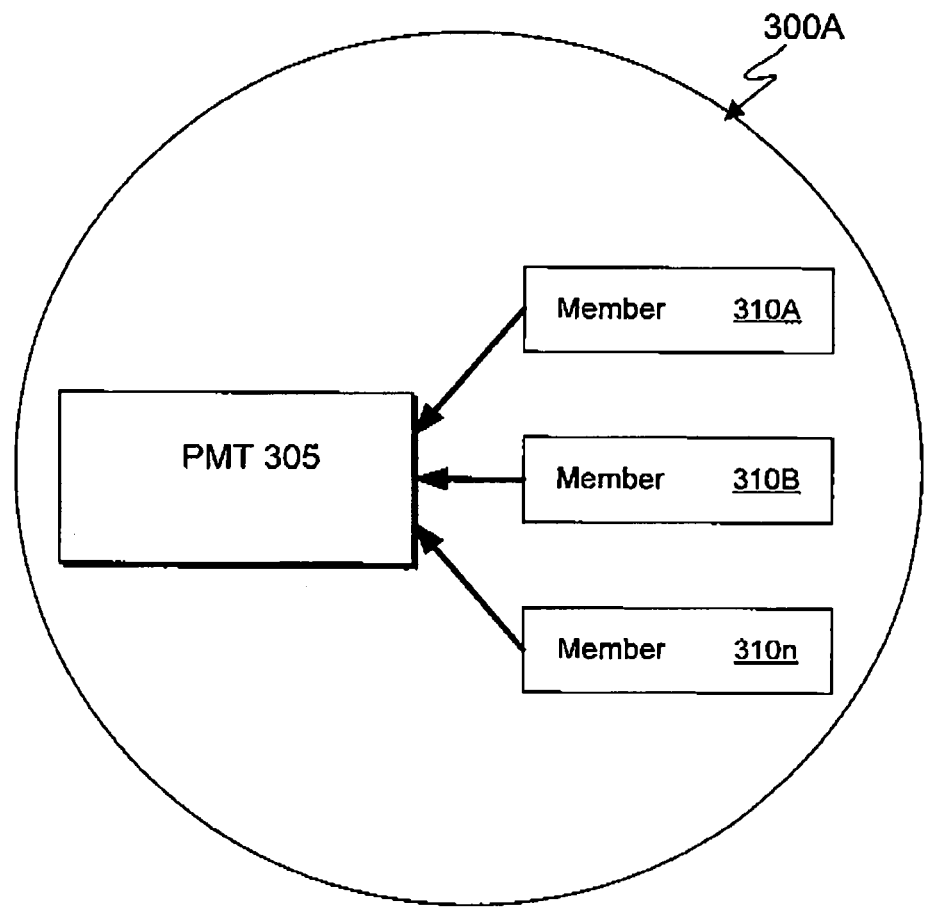
FIG. 3A is an exemplary single community utilizing a personalized messaging system, in accordance with an embodiment of the present invention.
Figure 3B:
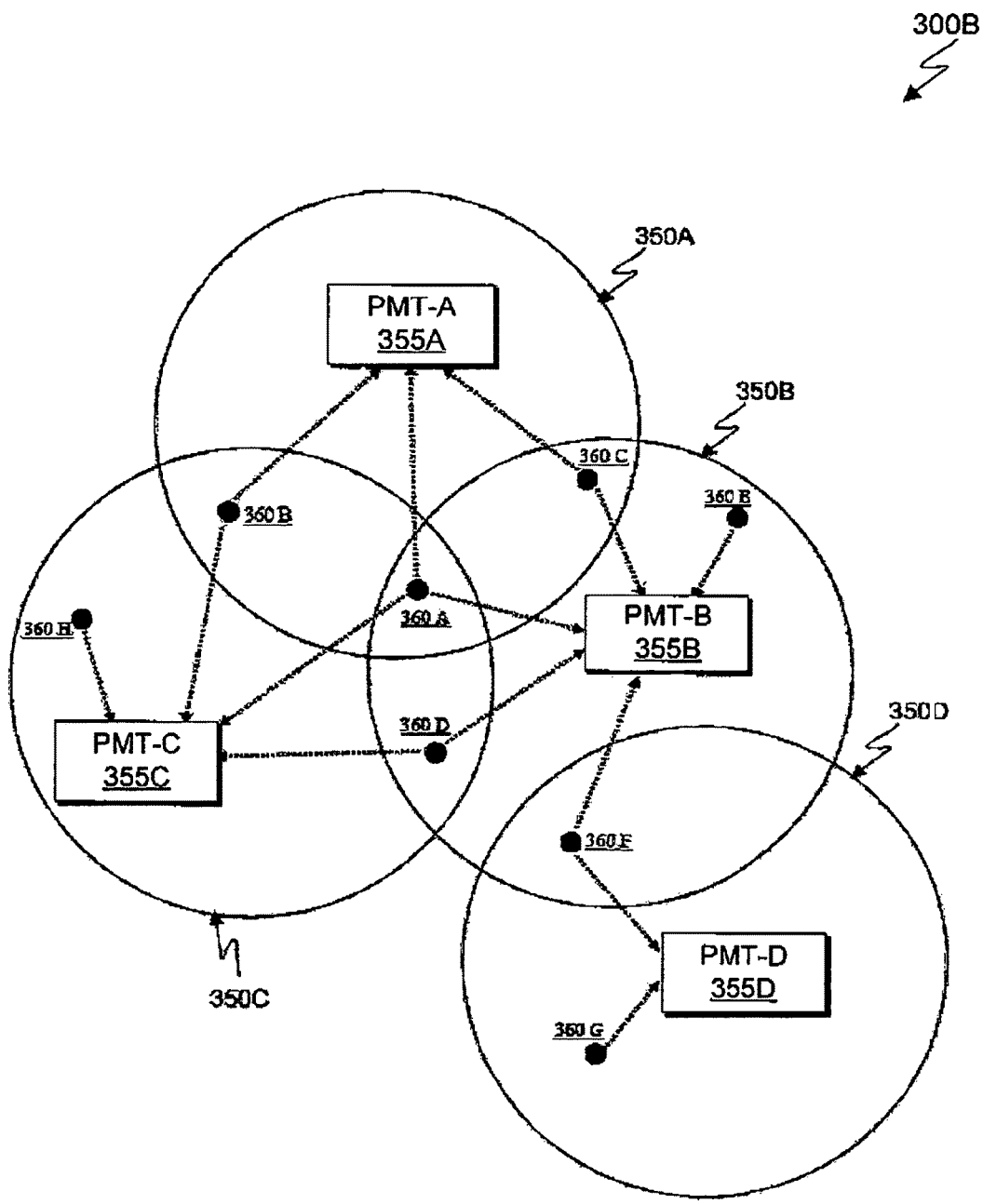
FIG. 3B is an exemplary multi community utilizing personalized messaging systems, in accordance with an embodiment of the present invention.

FIGS. 3A and 3B depict an exemplary single community and an exemplary multi community utilizing personalized messaging systems, respectively, in accordance with an embodiment of the present invention.

FIG. 3A depicts a single community 300A utilizing a single PMT, PMT-A 305. PMT-A 305 contains the PMT file utilized between the community 300A members, member 310A, member 310B through member 310n (hereinafter 'members 310A-310n'). Member 310A-310n can create a new keyword and associated detailed message to be used as shorthand and/or abbreviation when typing a message to be sent to others in community 300A. The newly updated keyword may be uploaded to PMT-A 305 and downloaded from PMT-A 305 to the remaining members of community 300A, for example, member 310A-310n.

FIG. 3B depicts an exemplary multi community, environment 300B, in accordance with an embodiment of the present invention. The multi-community environment of 300B depicts four separate communities (community 350A, community 350B, community 350C and, community 350D, hereinafter 'community 350A-350D') which community members (member 360A, member 360B, member 360C, member 360D, member 360E, member 360F, member 360G, and member 360H) are interspersed in.

Community 350A comprises member 360A, member 360B, and member 360C and utilizes PMT-A 355A between its members. PMT-A 355A may be stored on each members PMT storage 134A-134n, respectively. Additionally and/or alternatively, PMT-A 355A may be stored on information repository 122. PMT-A 355A is shared only between its members (member 360A, member 360B, and member 360C) allowing each member to update PMT-A 355A. It is noted that member 360A, member 360B, and member 360C are also in other communities as well. As such, member 360A, member 360B, and member 360C may have access and utilize different PMT files. For example, in addition to utilizing PMT-A355A, member 360B, and member 360C also utilize PMT-C 355C and PMT-B 355B, respectively. Member 360A utilizes PMT-A 355A, PMT-B 355B and PMT-C 355C, as member 360A is in community 350A, community 350B, and community 350C.

Community 350B comprises five members (member 360A, member 360C, member 360D, member 360E and member 360F) and utilizes PMT-B 355B between its members. PMT-B 355B is shared only between its members (member 360A, member 360C, member 360D, member 360E and member 360F) allowing each member to update PMT-B 355B. It is noted that member 360A, member 360C, member 360D, and member 360F are also in other communities as well. As such, member 360A, member 360C, member 360D, and member 360F may have access and utilize different PMT files. Member 360A utilizes PMT-A 355A, PMT-B 355B and PMT-C 355C, as member 360A is in community 350A, community 350B, and community 350C. Member 360C utilizes PMT-A 355A, and PMT-B 355B, as member 360C is in community 350A and community 350B. Member 360D utilizes PMT-B 355B and PMT-C 355C, as member 360D is in community 350B and community 350C. Member 360E has access to only PMT-B 355B, as member 360E is in community 350B, only. Member 360F utilizes PMT-B 355B and PMT-D 355D, as member 360F is in community 350B and community 350D.

Community 350C comprises four members (member 360A, member 360B, member 360D, and member 360H) and utilizes PMT-C 355C between its members. PMT-C 355C is shared only between its members (member 360A, member 360B, member 360D, and member 360H) allowing each member to update PMT-C 355C. It is noted that member 360A, member 360B, and member 360D are also in other communities as well. As such, member 360A, member 360B, and member 360D may have access and utilize different PMT files. Member 360A utilizes PMT-A 355A, PMT-B 355B, and PMT-C 355C, as member 360A is in community 350A, community 350B, and community 350C. Member 360B utilizes PMT-A 355A, and PMT-C 355C, as member 360B is in community 350C and community 350A. Member 360D utilizes PMT-B 355B and PMT-C 355C, as member 360D is in community 350B and community 350C. Member 360H has access to only PMT-C 355C, as member 360H is in community 350C, only.

Community 350D comprises two members (member 360F and member 360G) and utilizes PMT-D 355D between its members. PMT-D 355D is shared only between its members (member 360F, and member 360G) allowing each member to update PMT-D 355D. It is noted that member 360F is also in other communities as well. As such, member 360F, may have access and utilize different PMT files. Member 360F utilizes PMT-D 355D and PMT-B 355B, as member 360F is in community 350B and community 350D. Member 360G has access to only PMT-D 355D, as member 360G is in community 350D, only.

Figure 4:
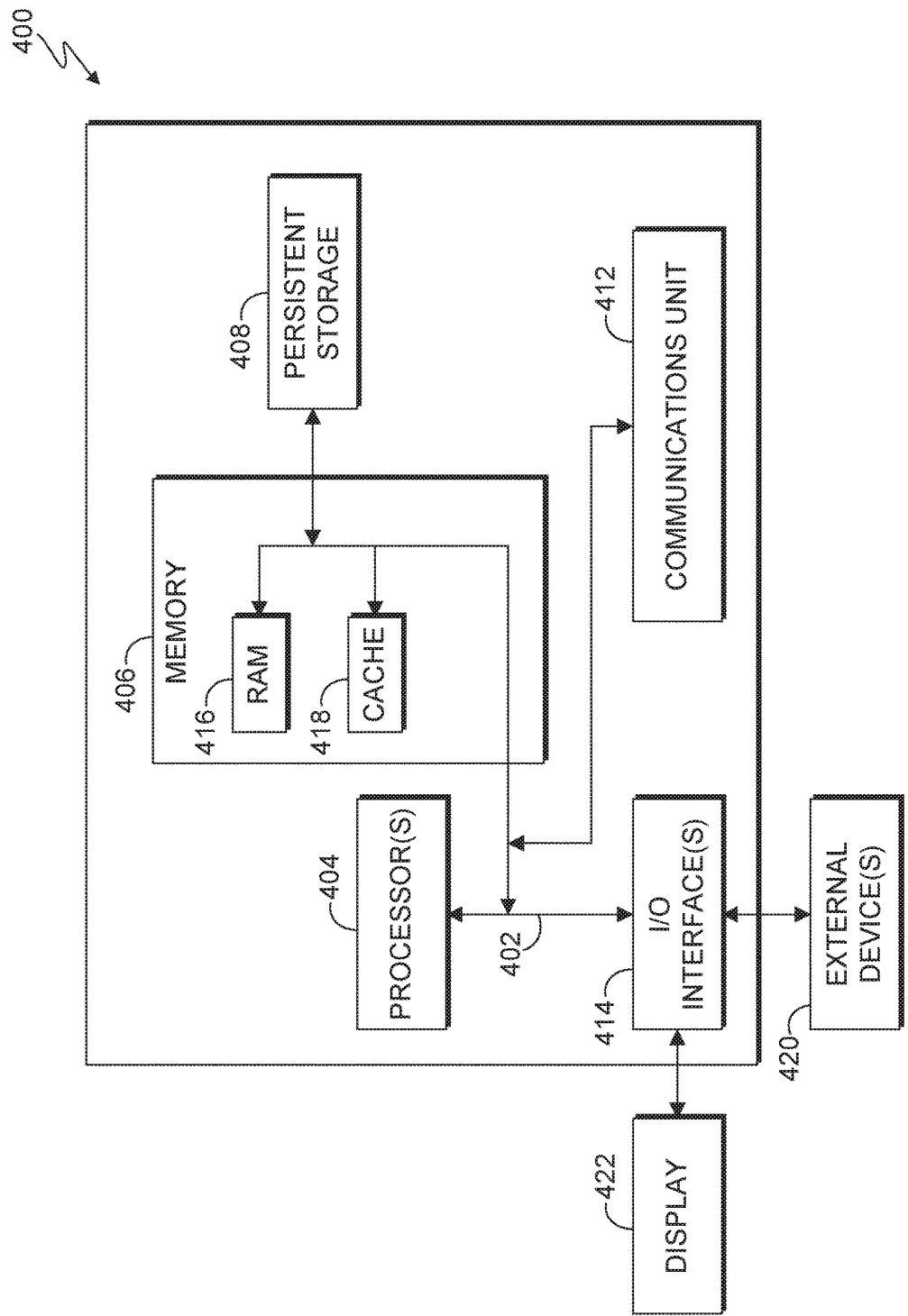
FIG. 4 is a block diagram of the internal and external components of a computer system, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation, and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Persistent storage 408 may include, for example, a plurality of magnetic hard disk drives. Programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Software and data used to practice embodiments of the present invention can be downloaded to computer system 400 through communications unit 412 (i.e., via the Internet, a local area network, or other wide area network). From communications unit 412, the software and data may be loaded to persistent storage 408.

I/O interface(s) 414 allows for input and output of data with other devices that may be connected to computer system 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   authenticating, by one or more processors, a community, wherein the community enables sharing of messages between members of the community;
   receiving, by one or more processors, a message on a first device, wherein the message is sent from a second device, and wherein the first device and the second device are associated with members of the community of members;
   detecting, by one or more processors, an escape character and a keyword embedded together in the received message, wherein the escape character initiates a character sequence corresponding to the keyword in the received message, and wherein the initiated character sequence differentiates the keyword from text of the received message;
   based on detecting the escape character, determining, by one or more processors, a detailed message based in part on the keyword in the received message associated with the community;
   replacing, by one or more processors, the escape character and the keyword with the determined detailed message; and
   displaying, by one or more processors, the received message and the determined detailed message.

2. The method of claim 1, wherein determining the detailed message, further comprises:
   detecting, by one or more processors, multiple detailed messages associated with the keyword; and
   responsive to detecting multiple detailed messages associated with the keyword, determining, by one or more processors, the associated detailed message based on content of the received message.

3. The method of claim 1, wherein determining the detailed message, further comprises:
   identifying, by one or more processors, the keyword is outside the determined detailed message within the community.

4. The method of claim 1, further comprising:
   detecting, by one or more processors, a commonly used string of characters in a message based in part on:
   a context of the message,
   a usage history of the first device, and
   a usage history of the community;
   deriving, by one or more processors, a new keyword to replace the use of the commonly used string of characters in a message; and
   suggesting, by one or more processors, the new keyword to a user.

5. The method of claim 1, wherein determining the detailed message, further comprises:
   determining, by one or more processors, whether the detailed message from the second device comprises at least one of a location and a time; and
   altering, by one or more processors, the detailed message to correspond to the at least one of location, and the time of the first device.

6. The method of claim 1, further comprising:
   sending, by one or more processors, a message from the first device to the second device.

7. The method of claim 1, further comprising:
   detecting, by one or more processors, a plurality of messages received from a third device; and
   suggesting, by one or more processors, a new community to be established between the first device and the third device, wherein the new community comprises a new set of keywords and associated detailed messages designated for the new community.

8. The method of claim 1, further comprising:
   updating, by one or more processors, each keyword and associated detailed message with the community.

9. A computer program product comprising:
   program instructions to authenticate a community, wherein the community enables sharing of messages between members of the community;
   program instructions to receive a message on a first device, wherein the message is sent from a second device, and wherein the first device and the second device are associated with members of the community of members;
   program instructions to detect an escape character and a keyword embedded together in the received message, wherein the escape character initiates a character sequence corresponding to the keyword in the received message, and wherein the initiated character sequence differentiates the keyword from text of the received message;

based on detecting the escape character, program instructions to determine a detailed message based in part on the keyword in the received message associated with the community;

program instructions to replace the escape character and the keyword with the determined detailed message; and program instructions to display the received message and the determined detailed message.

10. The computer program product of claim 9, wherein determining the detailed message, further comprises:
program instructions to detect multiple detailed messages associated with the keyword; and
responsive to detecting multiple detailed messages associated with the keyword, program instructions to determine the associated detailed message based on content of the received message.

11. The computer program product of claim 9, further comprising:
program instructions to detect a commonly used string of characters in a message based in part on:
a context of the message,
a usage history of the first device, and
a usage history of the community;
program instructions to derive a new keyword to replace the use of the commonly used string of characters in a message; and
program instructions to suggest the new keyword to a user.

12. The computer program product of claim 9, wherein determining the detailed message, further comprises:
program instructions to determine whether the detailed message from the second device comprises at least one of a location and a time; and
program instructions to alter the detailed message to correspond to the at least one of location, and the time of the first device.

13. The computer program product of claim 9, further comprising:
program instructions to detect a plurality of messages received from a third device; and
program instructions to suggest a new community to be established between the first device and the third device, wherein the new community comprises a new set of keywords and associated detailed messages designated for the new community.

14. The computer program product of claim 9, further comprising:
program instructions to update each keyword and associated detailed message with the community.

15. A computer system comprising:
one or more computer processors;
one or more computer readable storage media;
program instructions to authenticate a community, wherein the community enables sharing of messages between members of the community;
program instructions to receive a message on a first device, wherein the message is sent from a second device, and wherein the first device and the second device are associated with members of the community of members;
program instructions to detect an escape character and a keyword embedded together in the received message, wherein the escape character initiates a character sequence corresponding to the keyword in the received message, and wherein the initiated character sequence differentiates the keyword from text of the received message;
based on detecting the escape character, program instructions to determine a detailed message based in part on the keyword in the received message associated with the community;
program instructions to replace the escape character and the keyword with the determined detailed message; and
program instructions to display the received message and the determined detailed message.

16. The computer system of claim 15, wherein determining the detailed message, further comprises:
program instructions to detect multiple detailed messages associated with the keyword; and
responsive to detecting multiple detailed messages associated with the keyword, program instructions to determine the associated detailed message based on content of the received message.

17. The computer system of claim 15, further comprising:
program instructions to detect a commonly used string of characters in a message based in part on:
a context of the message,
a usage history of the first device, and
a usage history of the community;
program instructions to derive a new keyword to replace the use of the commonly used string of characters in a message; and
program instructions to suggest the new keyword to a user.

18. The computer system of claim 15, wherein determining the detailed message, further comprises:
program instructions to determine whether the detailed message from the second device comprises at least one of a location and a time; and
program instructions to alter the detailed message to correspond to the at least one of location, and the time of the first device.

19. The computer system of claim 15, further comprising:
program instructions to detect a plurality of messages received from a third device; and
program instructions to suggest a new community to be established between the first device and the third device, wherein the new community comprises a new set of keywords and associated detailed messages designated for the new community.

20. The computer system of claim 15, further comprising:
program instructions to update each keyword and associated detailed message with the community.

* * * * *